(12) United States Patent  (10) Patent No.: US 9,090,410 B2
Faul et al.                (45) Date of Patent:    Jul. 28, 2015

(54) CONVEYOR DEVICE FOR COINS

(71) Applicant: NOVOMATIC AG, Gumpoldskirchen (AT)

(72) Inventors: Thomas Faul, Kaiserslautern (DE); Michael Rudolph Luft, Darmstadt (DE)

(73) Assignee: NOVOMATIC AG (AT)

( * ) Notice: Subject to any disclaimer, the term of this patent is extended or adjusted under 35 U.S.C. 154(b) by 0 days.

(21) Appl. No.: 14/359,089

(22) PCT Filed: Nov. 14, 2012

(86) PCT No.: PCT/EP2012/072534
§ 371 (c)(1),
(2) Date: May 17, 2014

(87) PCT Pub. No.: WO2013/072325
PCT Pub. Date: May 23, 2013

(65) Prior Publication Data
US 2014/0326579 A1    Nov. 6, 2014

(30) Foreign Application Priority Data

Nov. 18, 2011 (DE) .......................... 10 2011 055 538

(51) Int. Cl.
B65G 43/08    (2006.01)
B65G 54/02    (2006.01)
G07F 1/02     (2006.01)
G07D 13/00    (2006.01)
G07D 3/14     (2006.01)
G07D 3/16     (2006.01)

(52) U.S. Cl.
CPC ................ *B65G 54/02* (2013.01); *B65G 43/08* (2013.01); *G07D 13/00* (2013.01); *G07D 3/14* (2013.01); *G07D 3/16* (2013.01)

(58) Field of Classification Search
None
See application file for complete search history.

(56) References Cited

U.S. PATENT DOCUMENTS

| 3,338,372 | A | | 8/1967 | Mateling |
| 3,419,209 | A | | 12/1968 | Munn |
| 5,230,653 | A | * | 7/1993 | Shinozaki et al. ................ 453/4 |
| 5,477,953 | A | * | 12/1995 | Powell et al. ................. 194/209 |
| 5,639,206 | A | | 6/1997 | Oda et al. |
| RE39,076 | E | * | 4/2006 | von der Heide et al. ... 318/400.4 |
| 7,591,362 | B2 | | 9/2009 | Winau |

FOREIGN PATENT DOCUMENTS

| DE | 1259242 | 1/1968 |
| DE | 1963529 | 7/1970 |
| DE | 19841860 | 3/2000 |
| DE | 19907706 | 8/2000 |
| DE | 10261819 | 7/2004 |
| WO | 9404997 | 3/1994 |

OTHER PUBLICATIONS

International Search Report for PCT/EP2012/02534, English Translation attached to original, Both completed by the European Patent Office on Jan. 17, 2013, All together 7 Pages.

* cited by examiner

*Primary Examiner* — Kavel Singh
(74) *Attorney, Agent, or Firm* — Brooks Kushman P.C.

(57) ABSTRACT

A conveyor device for coins, having a mechanism for moving at least one coin in a predetermined movement direction which differs from the effective direction of gravity, under a force uninfluenced by a moved mechanical component, the conveyor device being coupled to a detection device which identifies the presence of the coin, in order to accelerate the coins in the predetermined movement direction in accordance with requirements.

12 Claims, 6 Drawing Sheets

Figure 1:
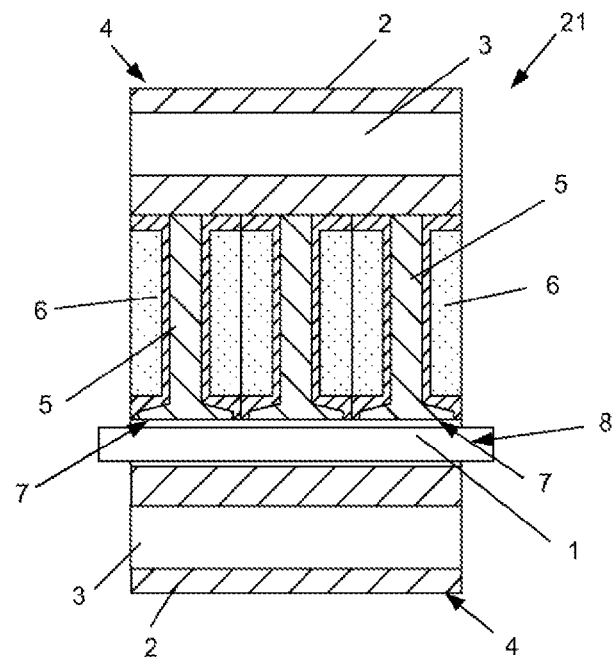

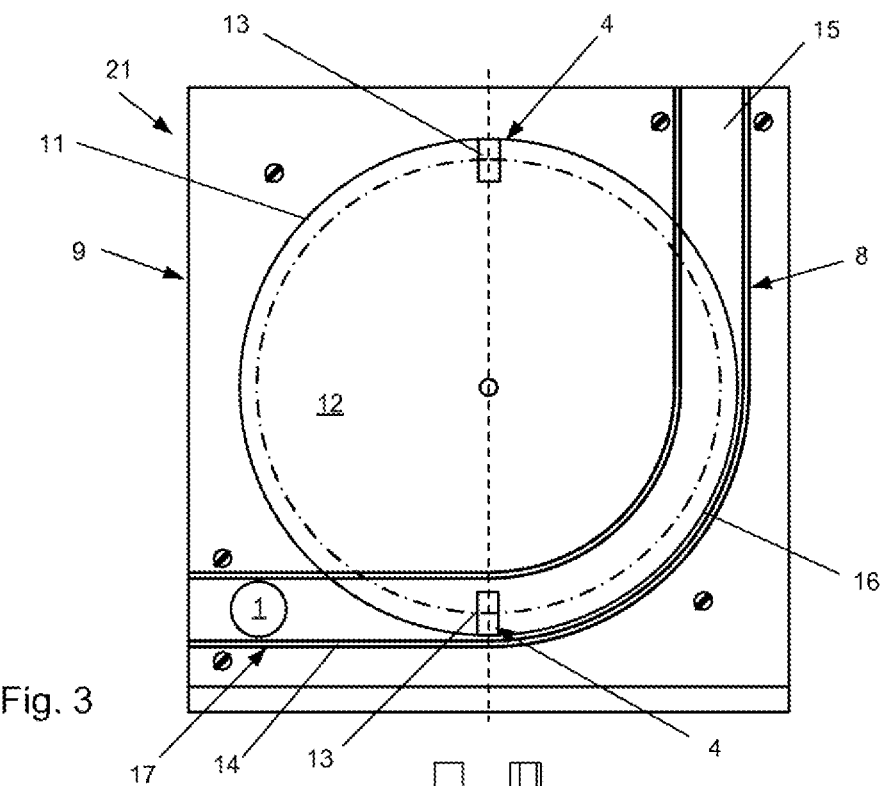
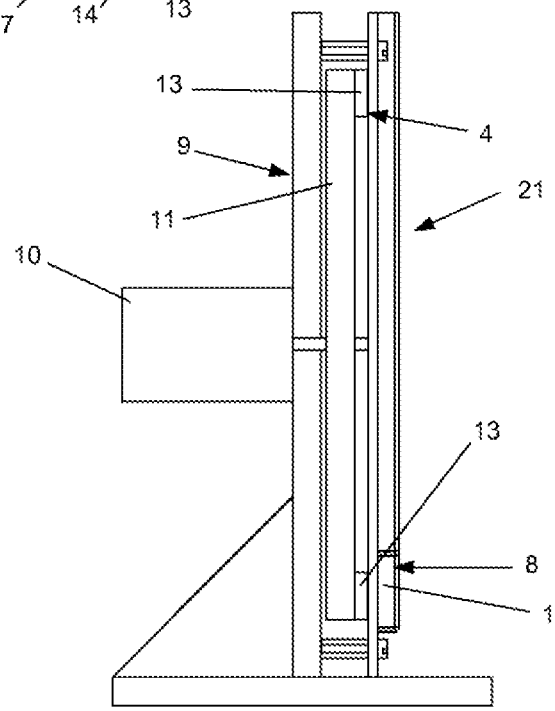
Fig. 3
Fig. 4

CONVEYOR DEVICE FOR COINS

CROSS-REFERENCE TO RELATED APPLICATION

This application is the U.S. national phase of PCT Application No. PCT/EP2012/072534 filed on Nov. 14, 2012, which claims priority to EP Patent Application No. 102011055538.2 filed on Nov. 18, 2011, the disclosures of which are incorporated in their entirety by reference herein.

The invention relates to a conveyor device for coins, comprising means for moving at least one coin, and to a machine for this purpose.

With any machines that are fed with coins, for example vending machines, cashpoint machines, coin-operated amusement machines, there is the problem that the coins have to reach a cash box or the like by virtue of the weight force of said coins, whereby the design freedom in terms of the arrangement of components inside the machine is extremely limited. In order for a coin, which for example may be soiled, to be reliably transported, a minimum gradient of the coin channel is to be observed. In practice, it has proven to be difficult to transport the coins, which often are not magnetic, against the weight force thereof, since there is only little space available within the machines for a conveyor device. Conveyor belts and the like are ruled out as conveyor devices due to their spatial requirement.

DE 102 61 819 A1 discloses a method and a device for sorting, counting and inspecting coins. In this case, the device has a separating device for the coins. To accelerate the coins as they leave the separating device, an acceleration wheel is provided, of which the lateral outer surface comes to rest against the coins as the coins are accelerated.

U.S. Pat. No. 3,419,209 A discloses a conveyor device for coins, comprising means for moving at least one coin in a predetermined movement direction, which differs from the effective direction of gravity, under a force uninfluenced by a moved mechanical component, which accelerates the coins in a tube with use of air or water.

The object of the invention is to create a conveyor device and a machine comprising a conveyor device, which reliably and quickly transport coins with no wear and have a relatively short response time.

In accordance with the invention, the object is achieved by the features of the independent claims.

The features of the dependent claims constitute advantageous embodiments.

A conveyor device for coins, preferably a magnetic drive, enables at least one coin to be moved in a predetermined movement direction, which differs from the effective direction of gravity, under a force uninfluenced by a moved mechanical component. The conveyor device being coupled to a detection device, which identifies the presence of the coin, in order to accelerate the coins in the predetermined movement direction as required.

The coins preferably are transported by the magnetic drive, for example in a field of forces, without the coin being acted on in any way by a mechanical component in order to accelerate said coin, the magnetic drive being activatable as required, preferably when the detection device has identified the presence of a coin to be transported. By way of the method, coins arranged on a flat surface for example can be accelerated and transported to practically any location. It is also possible to separate coins, which are piled above one another and beside one another in an unordered manner. Coins that are in free-fall are therefore acted on contactlessly by force in such a way that the movement direction of said coins changes. Thus, it is not necessary to observe specific angular positions in order to transport the coins within the machine in a gravity-controlled manner, and the manufacturer has a relatively large amount of design freedom with regard to the arrangement of the transport parts for the coins, which generally have to be transported from a coin slot to a cash box and/or counting unit, possibly with intermediate arrangement of a coin inspection unit. The conveyor device functions substantially without wear. The detection device can be based on optical, gravimetric or similar principles of action. It may also function on the basis of an upstream electric/electronic device, which detects or inspects the coins.

In order to influence the movement direction of the coins or to accelerate the coins in a desired direction, the coins are transported contactlessly through a flowing fluid, in particular air, or by means of a magnetic field, in particular a traveling magnetic field.

The traveling magnetic field, also referred to as a magnetic traveling field, induces in the metal coin an eddy current, which in turn in accordance with Lenz's law generates a magnetic field acting against the traveling magnetic field. If the traveling magnetic field moves quickly relative to the coin, the coin is then entrained by the magnetic field. This effect, which is known conversely from an eddy current brake, is utilized within the scope of the invention to transport coins, in particular against the weight force thereof. A similar principle of action is known from a linear motor. The coin is indeed heated relatively easily in the traveling magnetic field due to the induced current, however this does not have a negative effect. It is of course also possible to move a coin through a fluid flow in a desired direction, the device for generating the fluid flow comprising, for example, a pump, a fan or a compressor depending on the selected fluid. The manufacturer of such a machine is not bound to specific minimum gradients for reliable coin transport, rather the coin can also be transported over horizontal and ascending portions.

The machine advantageously comprises a coin support surface and/or a coin channel, at least one magnet element for generating a traveling magnetic field transporting the coin being associated with the coin support surface or the coin channel as means for moving the coin, at least in portions. Due to the transport of the coins by means of the traveling magnetic fields associated with the coin support surface or the coin channel over portions approximately 2 to 3 cm long for example, it is possible to guide the coins through the machine over an approximately arbitrary course or to separate coins that are present in a pile.

In one embodiment the magnet element is connected to a control system that is coupled to the detection device, which identifies the presence of a coin, in order to generate as required the traveling magnetic field conveying the coin. The magnetic traveling field is therefore then only generated when a coin to be transported is located on the coin support surface or in the coin channel, in particular in the region of the field generation, thus saving energy.

Since the coin generally does not have to be transported forcibly over the entire course of the coin channel, the magnet element is expediently arranged in a region of the coin support surface or of the coin channel in which an acceleration of the coin for transport thereof is necessary, preferably at a location potentially arranged higher, in particular in or before an arch-shaped course portion or an ascending portion, or a descending portion with low incline.

To generate the traveling magnetic field in order to accelerate the coin, at least one rotating permanent magnet or a plurality of individual magnets arranged on the periphery of a rotating body or an electromagnet arrangement are advantageously provided as a magnet element. Both the permanent magnet, embodied for example as a bar magnet, and the rotating body are rotated quickly, for example when detecting or identifying a coin to be accelerated, in such a way that the traveling magnetic field moves quickly relative to the coin and the magnetic field entrains the coin. An electric motor rotating the permanent magnet or the rotating body is moved by the control system in the case that a coin is present on the coin support surface or in the coin channel.

The control system expediently controls the voltage supply of a coil arrangement of the electromagnets of the electromagnet arrangement. Thus, if the detection device determines that a coin is located in the coin channel or on the coin support surface, that is to say in a region in which it is necessary to apply a force to the coin for the transport thereof, a corresponding signal is issued to the control system, which in turn supplies voltage to the coils of the electromagnets of the electromagnet arrangement in order to generate the traveling magnetic field for transporting the coin. Of course, it is also possible for the control system to be involved in the management of a motor for the rotary movement of the magnet or of the rotating body carrying the magnet(s), for example in order to set different speeds of rotation.

The electromagnets advantageously form the coin support surface and/or the coin channel. Of course, it is not necessary for the electromagnets to form the complete coin support surface or the entire coin channel, however it is not necessary to provide an additional support surface or a separate channel in the regions in which electromagnets are provided for the transport of coins.

In accordance with a development, a substantially E-shaped upper yoke has a coil-wound armature, the coin support surface or the coin channel being formed between free end faces of the armature and a lower yoke distanced therefrom. The individual coils are activated, that is to say acted on by voltage, in succession in a known manner, for example by means of a delta connection, in order to generate a traveling magnetic field that transports the coin through the air gap of the yoke. The directional specifications upper and lower are not to be understood as a limiting absolute directional or positional specification, since any orientation can be implemented, the upper and the lower yoke merely being arranged substantially parallel to one another.

In order to transport a coin by means of a fluid, a fan for generating an airflow transporting the coin is preferably associated in a coin channel as means for moving the coins and is connected to the control system so as to be supplied with voltage as required, the control system being coupled to the detection device, which identifies the presence of a coin. The coin channel can be arranged in a horizontal plane or a slope and may have a perforated intermediate base, wherein the coins are transported above the intermediate base and air is blown below the intermediate base into the coin channel, preferably by means of the fan, which preferably also generates an airflow for cooling the machine.

A person skilled in the art will be aware of the fact that the invention can be used to transport coins in a large number of different machines, for example any cashpoint machines, cash dispensers or vending machines. A claimed use is a machine, in particular an amusement machine, comprising a coin slot that is connected by a coin channel to a coin inspector and a coin cash box, a conveyor device as explained previously being associated with the coin channel, at least in portions.

Furthermore, the above-described conveyor device is used in a machine, in particular an amusement machine, comprising a counting unit for coins which is associated with the conveyor device, a control system of the counting unit being coupled to the means and/or the detection device. By way of example, the counting unit may comprise the coin support surface, on which the coins are present in a pile, and the conveyor device is used to sort and/or to transport the coins, and, coupled for example to a corresponding sensor arrangement, which in particular detects the value of coins, can transport the coins for counting, that is to say into a region outside the machine, to which a user of the amusement machine has access. Here, the detection device identifies the presence of coins. Of course, the detection device can also be formed in such a way that it identifies the value of a coin that is present.

The conveyor device is preferably arranged upstream or downstream of a coin stack tube for feeding in and/or for dispensing an individual coin. The counting unit expediently comprises a plurality of coin stack tubes, which are arranged in succession and have different diameters, the coins being transportable above the coin stack tubes by means of the conveyor device from the coin stack tube having the smallest diameter to the coin stack tube having the largest diameter in order to be sorted in accordance with their diameter. As a result of the coin stack tubes, which are optionally removable from the amusement machine, it is possible for the coins to be stored in an ordered manner.

It goes without saying that the features mentioned above and the features yet to be explained hereinafter can be used not only in the specified combinations, but also in other combinations. The scope of the invention is defined only by the claims.

Figure 2:
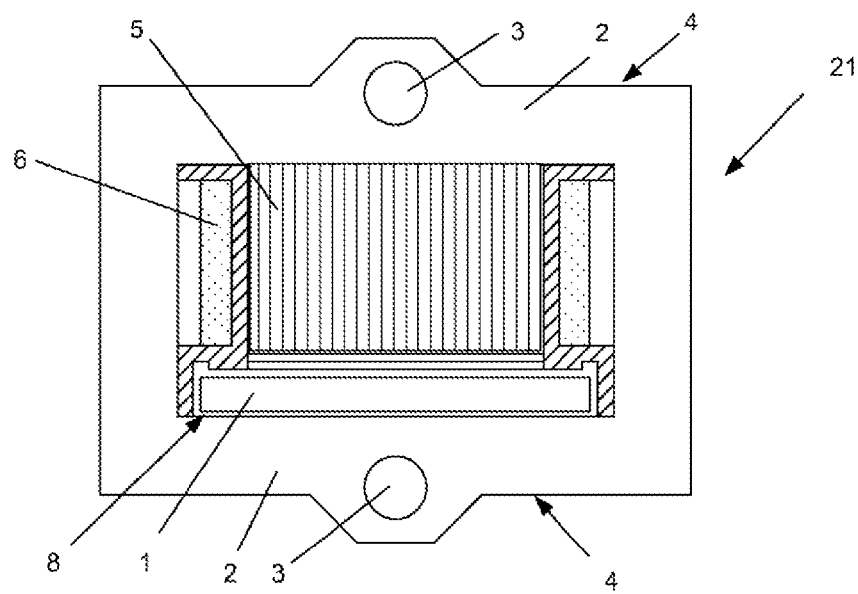
Figure 5:
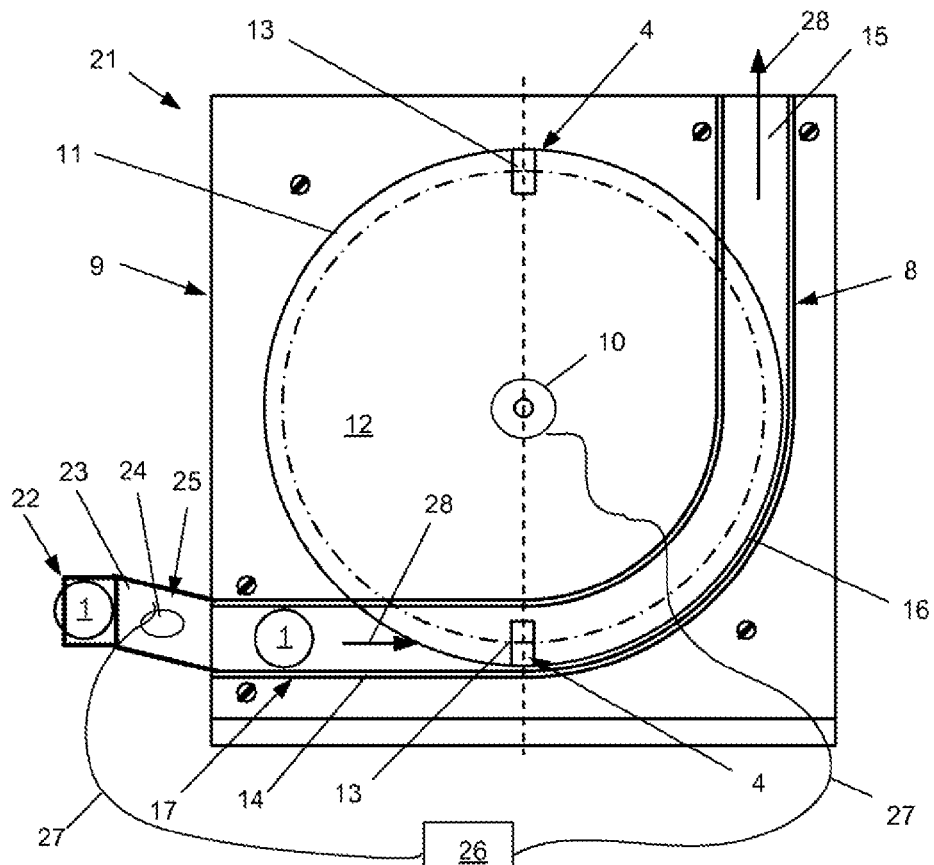
Figure 6:
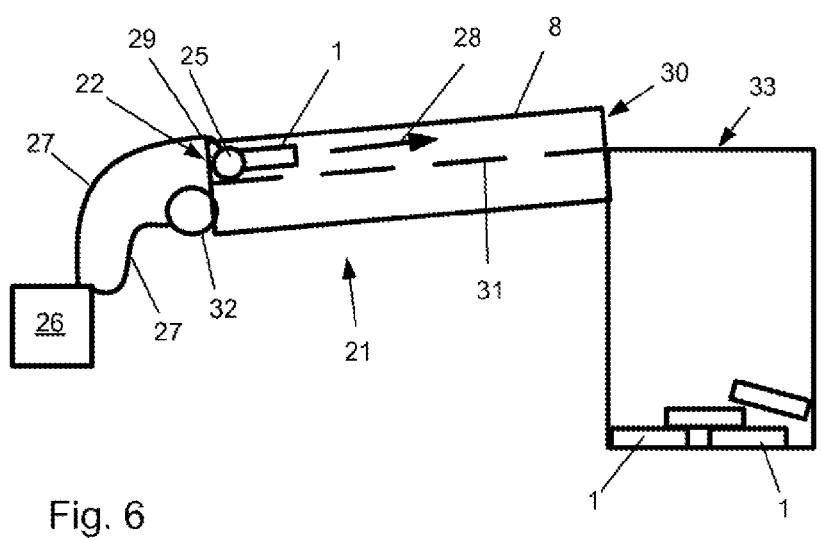
Figure 7:
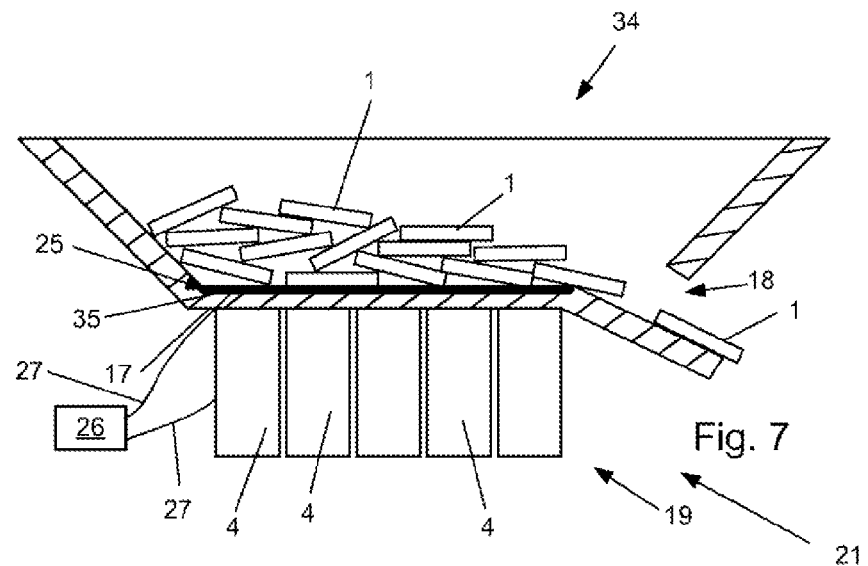
Figure 8:
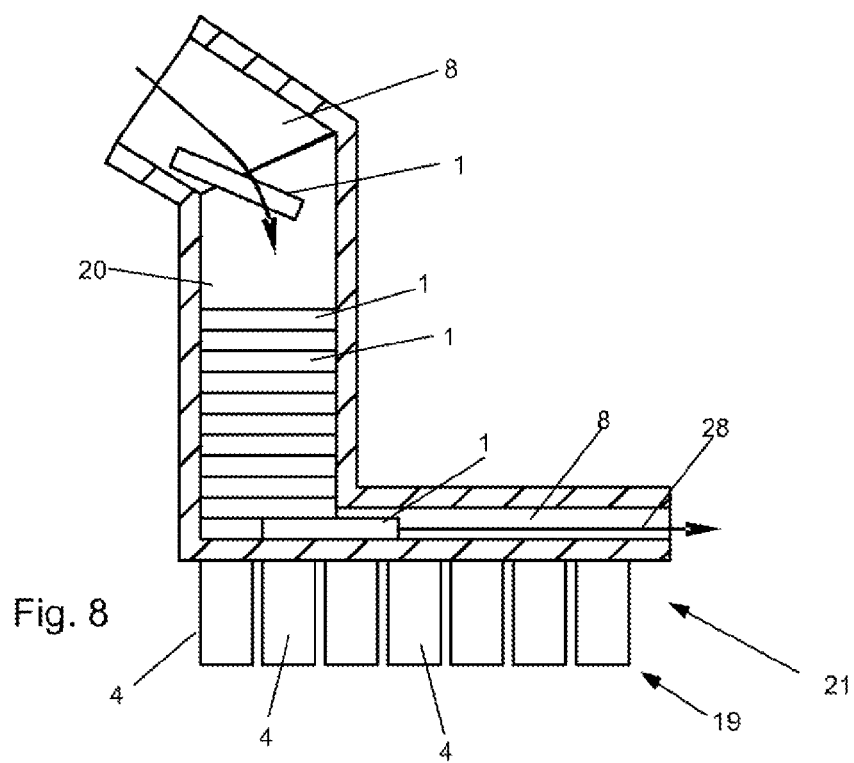
Figure 9:
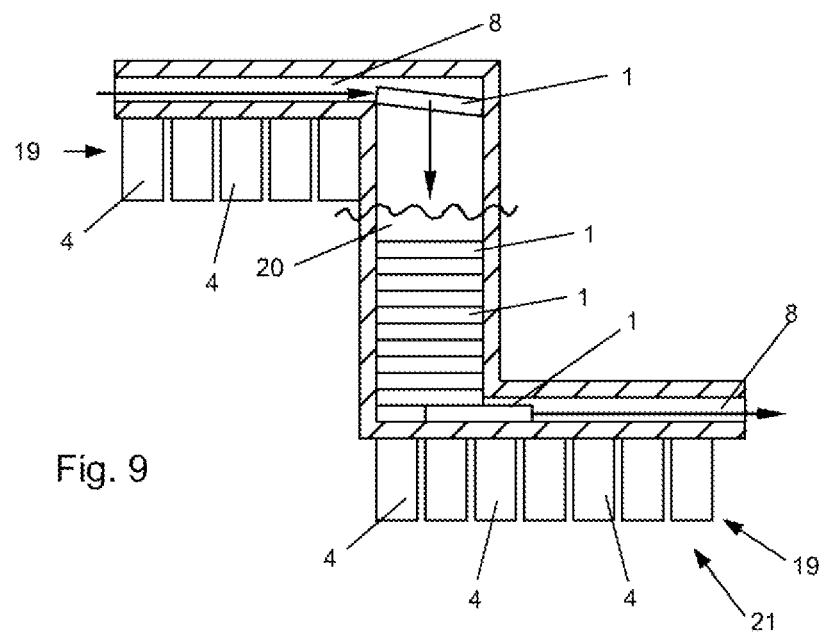
Figure 10:
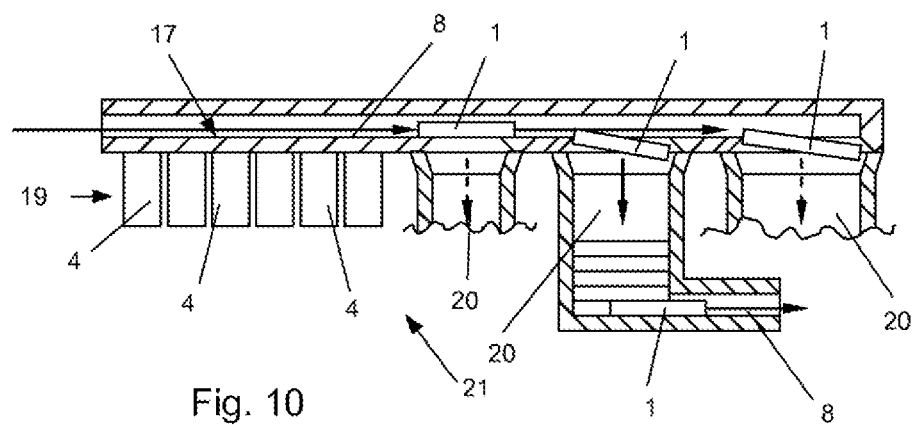
Figure 11:
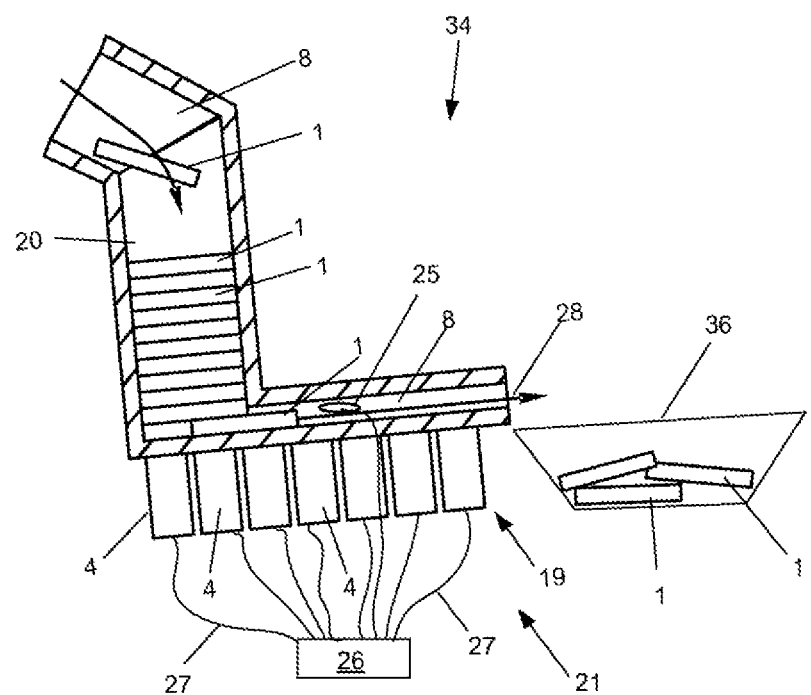

The invention will be explained in greater detail hereinafter on the basis of a number of exemplary embodiments with reference to the associated drawings, in which:

FIG. 1 shows an illustration of a longitudinal section of an electromagnet arrangement of the conveyor device for coins, FIG. 2 shows an illustration of a cross section of an electromagnet arrangement, FIG. 3 shows a front view of a test arrangement of the conveyor device for coins, comprising rotatably arranged permanent magnets, FIG. 4 shows a side view of a test arrangement according to FIG. 3, FIG. 5 shows an illustration of the conveyor device according to FIG. 3 in an alternative embodiment, FIG. 6 shows a schematic illustration of an alternative conveyor device, FIG. 7 shows a schematic sectional illustration of a counting unit with associated conveyor device, FIG. 8 shows a schematic sectional illustration of an alternative counting unit with associated conveyor device, FIG. 9 shows a schematic sectional illustration of a further alternative counting unit with associated conveyor device, FIG. 10 shows a schematic sectional illustration of a third alternative counting unit with associated conveyor device, and FIG. 11 shows a schematic sectional illustration of a fourth alternative counting unit with associated conveyor device.

The conveyor device, magnetic drive 21 for a coin 1, in accordance with FIGS. 1 and 2, comprises an electromagnet arrangement that is formed substantially by an upper and a lower outer yoke 2 with mounting bores 3 for fastening screws and three inner yokes 2, which are arranged at uniform distances from one another and serve as armatures 5, the upper and the lower yoke 2 being interconnected and the armatures 5, over each of which a coil 6 is wound, constituting magnet elements 4.

The free end faces 7 of the armatures 5 are distanced from the region of the lower yoke 2 and form a coin channel 8 in this gap. The three coils 6 provided are supplied with voltage in order to generate a traveling magnetic field in a known manner by means of a delta connection, said traveling magnetic field moving the coin 1 through the coin channel 8, such that a three-phase alternating current with phases offset uniformly from one another over time is available for the voltage supply of the individual coils 6. Due to the temporal sequence of the application of voltage to the coils 6, the traveling magnetic field is produced with a defined direction.

With the test arrangement according to FIGS. 3 and 4, a rotating body 11 in the form of a disk 12 and coupled to an electric motor 10 is mounted on a frame 9, a plurality of magnet elements 4 formed as permanent magnets 13 being associated in a diametrically opposed manner with the rotating body 11 in the region of the outer periphery thereof. The coin channel 8, in which the coin 1 is fed in a lower horizontal portion 14, is arranged parallel to and at a distance from the rotating body 11 on the side facing the permanent magnets 13. The horizontal portion 14 of the coin channel 8 forms a coin support surface 17 and is connected via an arch 16 to a vertical portion 15, the arch 16 running over the same radius described by the permanent magnets 13 as the rotating body 11 rotates.

When the rotating body 11 is rotated at a relatively quick speed of rotation in an anti-clockwise direction, the coin 1 is entrained from the horizontal portion 14 of the coin channel 8 in the direction of the arch 16 and is accelerated in such a way that it leaves the vertical portion 15 of the coin channel 8. The exit speed of the coin 1 from the coin channel 8 of the test arrangement is substantially dependent on the speed of rotation of the rotating body 11.

In accordance with FIG. 5 a coin slot 22 is associated with the coin channel 8 on the entry side, a coin 1 being located in said slot and passing via an inclined feed channel 23 into the coin channel. An optically active device 24 of a detection device 25, which is connected by means of electric cables 27 to a control system 26 for signal evaluation or signal processing, is located in the feed channel 23, the control system 26 being connected in turn via cables 27 to the electric motor 10 in such a way that it can switch on and switch off the voltage supply thereto. If the detection device 25 identifies the presence of a coin 1 in the feed channel 23, it then supplies voltage to the electric motor 10, which thereupon rotates in an anti-clockwise direction in order to entrain the coin 1 from the horizontal portion 14 of the coin channel 8 in accordance with the arrow 28 in the direction of the arch 16 and to accelerate the coin in such a way that it leaves the vertical portion 15 of the coin channel 8 upwardly in the direction of the arrow 28, that is to say against the effective direction of gravity.

In an alternative embodiment the conveyor device 21 according to FIG. 7 comprises a coin channel 8 extending in an incline from a coin entry 29, which for example is formed by a coin slot 22, to a coin exit 30 potentially arranged higher, a perforated intermediate base 31 being located in said coin channel along the longitudinal extension thereof. The detection device 26 for identifying the coin 1 is located in the region of the coin entry 29 and is connected via the cable 27 to the control system 26. If the detection device 26 determines that a coin 1 is located in the coin channel 8 above the perforated intermediate base 31, it sends a corresponding signal to the control unit 26, which for example can be integrated into a control unit of a machine, in particular a cash processing control system or a game course control system of an amusement machine or the cash management control system thereof. The control system 26 switches on the voltage supply of a fan 32, which generates an airflow beneath the intermediate base 31 in order to move the coin 1 in the direction of the arrow 28. A coin cash box 33, which is preferably removable from the machine and in which the coins 1 are collected, is located at the end of the coin channel 8, that is to say in the region of the coin exit 30.

A person skilled in the art is easily aware of the fact that the conveyor device can be implemented in a machine to be operated with coins 1. The conveyor device 21 is arranged with its different magnet elements 4 in a portion of a coin channel 8 after the coin slot 22, that is to say in the interior of the machine, where an acceleration of the coin 1 is necessary in order to ensure reliable transport.

In accordance with FIG. 7 a plurality of coins 1 are located in a pile on the coin support surface 17 of a counting unit 34, which discharges into a counting opening 18, the counting unit 34 comprising the detection device 25, which in the present case is formed as a weighing cell 35 arranged on the base side and is connected to the control system 26 via the cable 27, the control system being connected to the electromagnet arrangement 19 of the conveyor device 21 in order to supply voltage thereto as required. The electromagnet arrangement 19 installed beneath the coin support surface 17 comprises a plurality of magnet elements 4 that can be excited differently in order to generate a traveling magnetic field in order to separate and transport the coins 1. Specific further senses ensure an intelligent guidance of the traveling magnetic field via the controller of the control system 26 in order to move the pile of coins 1 such that these slide away from one another on account of corresponding switching dynamics of certain regions of the magnetic field.

FIG. 8 shows a coin stack tube 20, which is connected at the upper end to the coin channel 8 for gravity-controlled feeding of coins 1. The electromagnet arrangement 19 comprising the magnet elements 4 that can be exited differently for generating a traveling magnetic field is associated with the coin channel 8 arranged at the lower end and causes the coins 1 to be ejected in a separated manner from the coin stack tube 20. Of course, the electromagnet arrangement 19 is also connected here to a corresponding control system 26 for purposeful activation or voltage application.

According to FIG. 9, an electromagnet arrangement 19 for generating the traveling magnetic field is associated both with the upper-end coin channel 8 for feeding coins 1 into the coin stack tube 20 and with the lower-end coin channel 8 for removing the coins 1 from the coin stack tube 20.

In accordance with FIG. 10 the coin channel 8 is arranged above a plurality of coin stack tubes 20, which are arranged in succession and which have different diameters, the electromagnet arrangement 19, as part of the coin channel 8, forming the coin support surface 17. As a result of the traveling magnetic field, the coins 1 having different diameters are transported for the sorting thereof over the coin stack tubes 20, the coins being conveyed from the coin stack tube 20 having the smallest diameter to the coin stack tube 20 having the largest diameter. Due to the different masses and diameters of the coins 1, different transport speeds are created in the direction of the arrows 28 with constant field speeds. Information concerning the type of coin 1 is thus provided and is used by a control system of the control system 26 to stop the traveling magnetic field at a specific point so that the coin 1 falls into a specific coin stack tube 20. Here, the diameter of the coin 1 plays a selective role with respect to the diameter of the coin stack tube 20. Following the identification of a coin 1 or value thereof by a control system of the control system 26, an electromechanical flap (not illustrated) above the corresponding coin stack tube 20 can also be opened so that the coin 1 passes into the coin stack tube 20.

With the counting unit 34 according to FIG. 11, which corresponds substantially to the example according to FIG. 8, coins 1 pass through the coin entry 29, which can be coupled to a separating device, as is described by way of example in FIG. 7, through the coin channel 8 under the action of gravity and into a coin stack tube 20, with which the coin channel 8 extending in an incline to the coin exit 30 is associated at the lower end.

The electromagnet arrangement 19 comprising the magnet elements 4 that can be excited differently for generating a traveling magnetic field is provided below the inclined coin channel 8 comprising the detection device 25 and causes the coins 1 to be ejected in a separated manner from the coin stack tube 20 by means of a cooperation with the control system 26. The coin exit 30 discharges into a counting bowl 36, which is accessible for a user of the machine.

List of reference signs

| | |
|---|---|
| 1. | coin |
| 2. | yoke |
| 3. | magnet |
| 4. | magnet element |
| 5. | armature |
| 6. | coil |
| 7. | end face |
| 8. | coin channel |
| 9. | frame |
| 10. | electric motor |
| 11. | rotating body |
| 12. | disk |
| 13. | permanent magnet |
| 14. | portion |
| 15. | portion |
| 16. | arch |
| 17. | coin support surface |
| 18. | counting opening |
| 19. | electromagnet arrangement |
| 20. | coin stack tube |
| 21. | conveyor device |
| 22. | coin slot |
| 23. | feed channel |
| 24. | device |
| 25. | detection device |
| 26. | control system |
| 27. | cable |
| 28. | arrow |
| 29. | coin entry |
| 30. | coin exit |
| 31. | intermediate base |
| 32. | fan |
| 33. | coin cash box |
| 34. | counting unit |
| 35. | weighing cell |
| 36. | counting bowl |

The invention claimed is:

1. A conveyor device for coins, comprising;
   a magnetic drive having at least one magnet element for generating a traveling magnetic field for moving at least one metal coin in a predetermined movement direction, which differs from the effective direction of gravity, under a magnetic force uninfluenced by contact with a moved mechanical component;
   a detection device, which identifies the presence of the coin, in order to cause the magnetic drive to accelerate the coins in the predetermined movement direction as required; and
   a coin support surface and/or a coin channel, wherein the magnetic drive conveys the coin associated with the coin support surface or the coin channel, thru at least a portion thereof.

2. The conveyor device as claimed in claim 1, further comprising a control system that is coupled to the detection device, which identifies the presence of a coin, in order to generate a signal to the magnetic drive as required for the traveling magnetic field to convey the coin.

3. The conveyor device as claimed in claim 1, wherein the magnet element is arranged in a region of the coin support surface or of the coin channel in which an acceleration of the coin for transport thereof is necessary.

4. The conveyor device as claimed in claim 2, wherein the at least one magnet element comprises at least one rotating permanent magnet or a plurality of individual magnets arranged on the periphery of a rotating body.

5. The conveyor device as claimed in claim 2, wherein the at least one magnet element and electromagnet and the control system controls the voltage supply of a coil arrangement of the electromagnets of the electromagnet arrangement.

6. The conveyor device as claimed in claim 5, wherein the electromagnets form the coin support surface and/or the coin channel.

7. The conveyor device as claimed in claim 6, wherein a substantially E-shaped upper yoke comprises coil-wound armatures, the coin support surface or the coin channel being formed between free end faces of the armatures and a lower yoke distanced therefrom.

8. The conveyor device as claimed in claim 4, wherein the control system controls the voltage supply of an electric motor rotating the permanent magnets or the rotating body.

9. An amusement machine having a conveyor device as claimed in claim 1 further, comprising a coin slot that is connected by the conveyor device coin channel to a coin inspector and a coin cash box.

10. A machine, in particular an amusement machine, comprising a counting unit for coins, a conveyor device as claimed in claim 1 being associated with said counting unit, the control system of the counting unit being coupled to the means and/or the detection device.

11. The machine as claimed in claim 10, wherein the conveyor device is arranged upstream or downstream of a coin stack tube for feeding in and/or for dispensing an individual coin.

12. The machine as claimed in claim 10, wherein the counting unit comprises a plurality of coin stack tubes, which are arranged in succession and have different diameters, the coins being transportable above the coin stack tubes (by means of the conveyor device from the coin stack tube having the smallest diameter to the coin stack tube having the largest diameter in order to be sorted in accordance with their diameter.

* * * * *